United States Patent [19]

McCombs

[11] 4,210,562

[45] Jul. 1, 1980

[54] CELLULOSE-CONTAINING PHENOLIC RESIN-BASED BINDER

[75] Inventor: Frank P. McCombs, Newark, Ohio

[73] Assignee: Owens-Corning Fiberglas Corporation, Toledo, Ohio

[21] Appl. No.: 1,985

[22] Filed: Jan. 8, 1979

[51] Int. Cl.$^2$ ............................................. C08L 1/28
[52] U.S. Cl. ................................... 260/14; 428/290; 428/429; 428/436
[58] Field of Search ........................................ 260/14

[56] References Cited

U.S. PATENT DOCUMENTS

| | | | |
|---|---|---|---|
| 2,862,897 | 12/1958 | Barrentine et al. | 260/14 |
| 3,663,481 | 5/1972 | Freeman et al. | 260/14 |
| 3,932,686 | 1/1976 | Foley et al. | 428/268 |
| 3,944,703 | 3/1976 | Harding | 428/268 |
| 4,014,726 | 3/1977 | Fargo | 428/429 |
| 4,014,835 | 3/1977 | McCombs | 428/436 |

FOREIGN PATENT DOCUMENTS 315835  1/1931  United Kingdom ...................... 260/14

*Primary Examiner*—Edward M. Woodberry
*Attorney, Agent, or Firm*—Ronald C. Hudgens; Philip R. Cloutier; James B. Wilkens

[57] ABSTRACT

A hardenable binder composition is disclosed. The composition comprises a phenolic resin, hydroxyethylcellulose and a silane. The hydroxyethylcellulose being added in an amount sufficient to increase the wet tensile strength of the binder composition after cure thereof.

5 Claims, No Drawings

CELLULOSE-CONTAINING PHENOLIC RESIN-BASED BINDER

This invention relates to a binder composition, and, more particularly, to a hardenable binder composition containing a phenolic resin, which composition is especially adapted for use with glass or other vitreous fibers.

Wool-like and board-like masses of intermeshed glass and other vitreous fibers have been manufactured extensively heretofore. In their production, fibers of glass or other vitreous materials are made by drawing or flowing streams of a fused, vitreous material through comparatively small diameter orifices, and accelerating the streams exiting from the orifices to cause attenuation thereof to a desired average fiber diameter. The resulting fibers then are associated with a hardenable binder composition, usually a phenol-formaldehyde partial condensation product, and projected onto a foraminous conveyor where intermeshed fibers and associated binder are collected and subsequently heated to convert the binder composition to a hardened, infusible condition. The final heating step can be carried out while the intermeshed fibers and associated binder are compressed to a desired extent, in which case a board-like product having an apparent density as high as about twelve pounds per cubic foot can be produced. If no pressure is applied during the heating step, a wool-like product having an apparent density as low as about one pound per cubic foot can be produced. Various materials of this type have been produced, and have found widespread commercial use as both thermal and acoustical insulating materials. The board-like products can also serve a decorative function.

A phenolic resin, usually of the phenol-formaldehyde type, has been the customary organic resin constituent in binders for use with glass and other vitreous fibers in such wool-like and board-like products. The phenolic resin serves to lock the fibers to one another at points of contact in such structures.

Generally, a satisfactory binder composition, in addition to the organic resin constituent, contains other materials such as adhesion promoting agents, lubricants, cure accelerators, dyes, and the like, as will be discussed more fully hereinafter.

The present invention is directed to binder compositions containing hydroxyethylcellulose and their use. It has been found that hydroxyethylcellulose in a binder composition in appropriate proportions significantly increases the overall wet tensile strength of the binder composition, e.g. as measured on a shell molding made therefrom as subsequently described.

In one of its aspects the present invention is a hardenable binder composition comprising phenolic resin, hydroxyethylcellulose and a silane, where the hydroxyethylcellulose is present in an amount sufficient to increase the wet tensile strength of the binder composition after it has been cured. In another of its aspects the present invention is a process for preparing such a binder.

Hydroxyethylcellulose is a non-ionic, water-soluble, cellulose ether polymer; its aqueous solutions are thixotropic and are unaffected by cations. It is marketed by Hercules Inc., Wilmington, Delaware, under the trade designation NATROSOL.

Hydroxyethylcellulose is an ether of cellulose; the latter can be represented by the following formula, which shows its chain as being composed of anhydroglucose units:

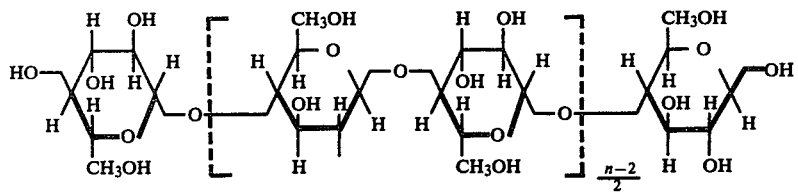

Each anhydroglucose unit contains three hydroxyls capable of reaction. By treating cellulose with sodium hydroxide and reacting the resulting product with ethylene oxide, hydroxyethyl groups are introduced, producing the hydroxyethyl ether. The reaction product is purified and ground to a fine white powder. The number of reactive hydroxyl groups substituted, per anhydroglucose unit, is known as the "degree of substitution". Theoretically, all three hydroxyls can be substituted. The product from such a reaction would have a degree of substitution, or D.S., of three.

Hydroxyethyl groups can be introduced into the cellulose molecule by reaction of ethylene oxide at the hydroxyls in the cellulose chain, and more ethylene oxide can then react at previously substituted hydroxyls, forming a side chain.

The average number of molecules of ethylene oxide that become attached to each anhydroglucose unit in cellulose, as described, is called moles of substituent combined, or M.S.

When ethylene oxide is reacted with cellulose to produce hydroxyethylcellulose, water solubility increases as a direct function of the amount of ethylene oxide combined. A compound having an M.S. of 2.5 has optimum solubility; an idealized structure of this compound is shown below:

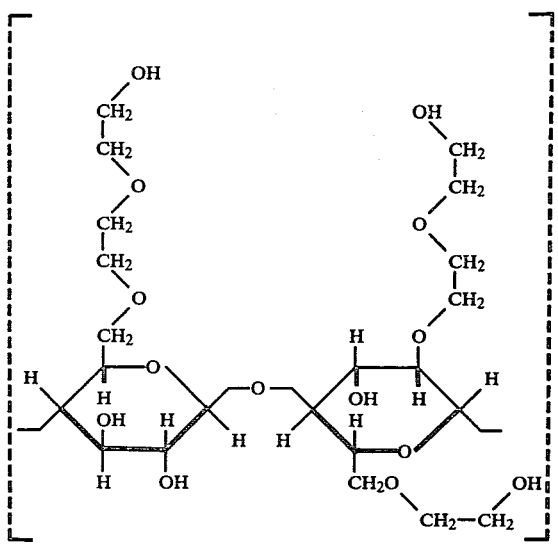

In accordance with the specific practice of this invention, the hydroxyethylcellulose is formulated into a hardenable phenolic resin binder composition in an amount sufficient to increase the wet tensile strength of the binder composition.

It has been found that optimum results are obtained when the hydroxyethylcellulose is utilized in a small effective amount of about 0.1 to about 2 percent, based on the dry weight of the phenolic resin not including other ingredients present in the binder composition. Hydroxyethylcellulose of low molecular weight has been found to give the best results.

The hardenable phenolic resin is one selected from the group consisting of phenol-formaldehyde partial condensation products and phenol-amino compound-formaldehyde condensation products, and is a phenolic resole. Such phenolic resoles are known to the art. In general, a phenolic resole is produced in the presence of a basic catalyst by reaction in an aqueous system of more than one mole of formaldehyde per mole of phenol. A detailed discussion of resoles can be found in *The Chemistry of Phenolic Resins*, Robert W. Martin, John Wiley & Sons, Inc., New York, New York, 1956 (see in particular pages 88–99, and cited references). Phenol-amino compound-formaldehyde condensation products can be produced by an aqueous alkaline condensation of phenol and formaldehyde to produce a mixture consisting essentially of phenol alcohols, adjustment of this phenol alcohol mixture to a pH at which further condensation of the phenol and formaldehyde is minimized and adding melamine or another amino-resin-former; the resulting reaction mixture can be heated to condense the melamine or other amino compound with the phenol alcohols and any unreacted formaldehyde. Condensation, particularly when the amino compound is urea or dicyandiamide, occurs under ambient conditions so that the heating step can be omitted when these amino compounds are used or, in any event, heatng can be employed to cause an appreciable condensation of the melamine or other amino compound. In any event, the phenol-amino compound-formaldehyde condensation products should be of such a state of condensation that they exhibit a high water tolerance. A comparatively high water tolerance is desirable in the resole as preferably a relatively dilute binder composition is used in order to avoid using an excessive amount of the binder.

The identity of the particular reactants and catalysts employed to produce the heat-hardenable phenolic resin appears to be of only incidental importance.

In most instances, and preferably so, formaldehyde and phenol are used, although any aldehyde and phenol producing a hardenable phenolic resole-type partial condensation product can be used. Aldehydes which can be used for replacement of the formaldehyde, in whole or part, include: paraformaldehyde, furfural, acetaldehyde, metaldehyde, tetraldehyde and the like. Phenols which can be used for replacement of the hydroxy benzene in whole or in part include: various cresols, xylenols, resorcinol, and the like. While melamine is frequently used as the amino-resin-former reactant, urea, thiourea, dicyandiamide and other like amino compounds capable of condensation with phenol alcohols and formaldehyde also can be used in place of part or all of the melamine. Any of the conventionally employed basic catalysts, for example any alkali metal or alkaline earth hydroxide, such as sodium hydroxide, barium hydroxide, calcium hydroxide, etc. or alkali metal carbonates or like basic condensation catalyst may be used.

A latent catalyst can also be used in a binder according to the present invention, in addition to the previously discussed resole and hydroxyethylcellulose. Such a catalyst is one which is effective during curing conditions to change the pH of the system to one at which condensation occurs at a relatively rapid rate. Typically, in a phenolic-resole system there is utilized in the best embodiment and practice an ammonium sulfate catalyst which under resin curing conditions releases ammonia gas from the system thereby decreasing the overall pH thereof.

A preferred ingredient of the binder system of this invention is a silane bonding or coupling aid. This agent is believed to serve the dual function of improving the bond between the resin binder and the glass surface and between the bonded mat and the subsequently applied saturating resin. It also gives moisture resistance and durability characteristics to the bonded mat. The preferred silanes for this invention are aminoalkylsilanes. However certain epoxy silanes may also be utilized.

The aminoalkylsilanes which are suitable for incorporation in the binder composition of the invention have the general formula, $R_n$—Si—$(-OR')_{(4-n)}$ where R is an aminoalkyl radical chemically bonded to the silicon atom, R' is an alkyl radical having from 1 to 4 carbon atoms, and n is an integer from 1 to 3, inclusive. A preferred class of silanes represented by the foregoing formula is one wherein n is 1 and R has the formula $H_2N$—R", and wherein R" is an alkylene radical having from 2 to 6 carbon atoms. A typical such silane is gamma-aminopropyltrimethoxysilane. Another such preferred class is one where R has the formula $H_2N$—R"—NH—R", wherein each R" independently represents an alkylene radical having from 2 to 6 carbon atoms.

Typical epoxy silanes suitable for use as bonding aids in binders according to the present invention include beta-(3,4 epoxycyclohexyl)-ethyltrimethoxysilane and gamma-glycidoxy-propyltrimethoxysilane. Still other epoxy silanes are described in U.S. Pat. No. 3,562,081, granted Feb. 9, 1971, incorporated herein by reference.

In formulating a binder composition according to the invention a silane is merely added to a mixing tank along with the other binder constituents, usually in an amount which ranges from about 0.01 to about 10 percent (the terms "percent" and "parts" are used herein, and in the appended claims, to refer to percent and parts by weight, unless otherwise indicated), preferably from about 0.05 to 0.5 percent, and most desirably, about 0.1 percent. When an alkoxy or other hydrolyzable silane comes in contact with water, hydrolysis of the alkoxy or other hydrolyzable group occurs followed by condensation and formation of a siloxane. It is to be understood that in the practice of this invention, aminoalkylsilanes and their hydrolysis products are encompassed. Preferred silanes include gamma-amino-propyltriethoxysilane and bis(beta-hydroxyethyl)-gamma-aminopropyltriethoxysilane.

Ammonium hydroxide is desirably used in preparing a binder according to the invention to adjust the pH to at least about 7, and to aid in the stabilization of the binder. Organic amines could be used for this purpose, but are less desirable because they are more expensive. Desirably, the pH of the emulsion is from about 7 to 9. Although a higher pH can be used, such unnecessarily involves the consumption of more ammonia or the like. Generally, this requires from about 3 to about 10 percent of ammonium hydroxide, based upon the binder solids.

Optional ingredients for the binder composition include a silicone release agent and an anti-foam compound. The preferred release agent is commercially available under the designation Si-55, and can be obtained from the General Electric Company. However, other conventional release agents can be used. The release agent functions to prevent build-up of the resin on the oven conveyor and associated apparatus carrying the glass fiber mat. When used, the release agent is desirably present in an amount ranging from about 0.2 to about 4 percent. A suitable anti-foaming agent may be added if desired. For instance, one of the surface-active materials (a blend of processed saturated fats of predominantly sulfated high melting point derivatives or a blend of non-ionic and anionic materials produced from saturated fatty derivatives) successfully used in the preparation of latex paints to minimize air entrapment by coalescence of bubbles can be utilized. This ingredient is not critical and can be omitted when foaming is not considered a critical problem.

The anti-foam agent is added as needed during the preparation of the binder. The preferred anti-foam agent is commercially available under the trade designation Anti-Foam Q, and is preferably added as a mixture of 10 parts Anti-Foam Q in 90 parts toluene. Any of the conventional anti-foam agents can be used instead of Anti-Foam Q.

A lubricant or lubricating agent can also be used in a binder according to the invention. This is generally an emulsion of oil and water. In one particular embodiment, such emulsion is prepared by emulsifying 90 parts mineral oil with 100 parts of water, using, as surfactants for the emulsification, 7 parts of an isooctyl phenyl polyethoxy ethanol and 3 parts of an oil cut, synthetic petroleum sulfonate having a molecular weight of approximately 50.

Other adjuvants such as various fillers, pigments, dyes, etc. can be used if desired, but such are not essential for the binder to be effective.

Desirably, the binder composition is applied to the glass fibers in such a way that the binder comprises from about 8.5 percent to about 11.5 percent of the glass fiber mat product. The binder preferably constitutes about 9 percent to 11 percent of the mat product on a dry weight basis. At least about 8.5 percent of binder is required for adequate bonding of the glass or other fibers so that the mat has structural integrity.

The following Example is presented to illustrate the best presently known mode in the practice of this invention.

EXAMPLE

A phenolic resin (hereinafter designated "Resole A") was first prepared from 72.3 parts aqueous solution of 50 percent formaldehyde, 26.7 parts phenol, 8.1 parts water and 1.3 parts calcium oxide. The formaldehyde and the phenol were added to a reactor and agitated about five minutes until the refractive index of the reaction mixture was within the range of 1.4340 to 1.4345, and thereafter until production of Resole A was complete. The water was then added, and the reaction mixture was agitated for an additional period of about five minutes until the refractive index was within the range of 1.4255 to 1.4260.

The reaction mixture was then heated to 115° F., and the calcium oxide was added thereto gradually, the total time for the calcium oxide addition having been about two hours. After the calcium oxide addition had been completed, the reaction mixture was heated to a temperature of 125° F. and held at that temperature for one hour, including the time required to reach temperature, then further heated to 150° F. and held until the free formaldehyde was 12.5–13.5 percent and then cooled to 80° F. or lower.

A urea-Resole A blend was then prepared from 105.4 parts Resole A, 52.0 parts 50 percent aqueous solution of urea and 20 percent aqueous phosphoric acid as required for a subsequently described pH adjustment. The reactants were agitated with a propeller-type agitator throughout the production of the blend. The Resole A was first charged to a mixing tank, followed by the urea solution, added in two separate steps, and sufficiently slowly that the temperature of the blend did not exceed 110° F. The blend was agitated for a total of two hours, including the time required to add the urea, was cooled to a temperature below 100° F., and was adjusted to a pH of about 7.5 with the phosphoric acid solution.

A glass fiber binder was then prepared from 1192 parts water, 0.34 part hydroxyethylcellulose, 0.67 part gamma-aminopropyltriethoxysilane, 0.34 part sodium hexametaphosphate, 0.67 part ammonium sulfate, 148 parts of the urea-resin blend prepared as described above, ammonium hydroxide as required for a subsequent pH adjustment, 8.21 parts of an oil emulsion and 2.68 parts of a red dye. The binder ingredients were charged, in the order recited, to a binder kettle, with continuous agitation. After addition of the urea-resole blend, the pH of the reaction mixture was adjusted to 8.5 with ammonium hydroxide.

The binder produced as described in the preceding paragraph has been used to produce glass fiber building insulation having an apparent density of about 2.5 pounds per cubic foot and a thickness of about 3.5 inches; it has also been used to produce roof-deck having an apparent density of about 5.5 pounds per cubic foot. In both cases, it has been found that either the time or the temperature required for cure of the binder can be decreased, by comparison with that required when similar products are made with a conventional binder which does not contain hydroxyethylcellulose.

A binder was prepared as described above from the blend of urea with Resole A, except that the amount of water used was reduced so that the solid content of the binder was 40 percent. A shell molding composition was then prepared by mixing 45 parts of the binder with 582 parts of small soda lime glass beads. Portions of this shell molding composition were then placed in a heated shell pattern in the shape of a "dog bone", and the pattern containing the molding composition was placed in a heated oven for cure of the composition. After cure, and separation from the pattern, the shell moldings were tested for tensile strength, as molded, and after heating in a humid atmosphere. While strength measurements made from duplicate shell moldings vary to some extent, possibly as much as 20 percent, it has been found that such strength measurements are reasonably accurate and do provide a good and satisfactory basis for comparison and evaluation of various resins and binder compositions as to their usefulness with fibrous glass to prepare bonded insulating material, roof-deck and the like. Shell moldings made from the binder produced as described above, and containing hydroxyethylcellulose, after heating in a humid atmosphere, were found to have an average tensile strength one-half percent higher than similar moldings made in the same manner from a binder composition which did not contain hydroxyethylcellulose, but which was otherwise identical.

Although the invention has been described principally in terms of using base catalyzed phenolics, the use of acid catalyzed phenolics in combination with hydroxyethylcellulose and a silane coupling agent is also advantageous, albeit somewhat less preferred than the base catalyzed resins.

It will be apparent that various changes and modifications can be made from the specific details of the invention as described herein without departing from the spirit and scope thereof as defined in the appended claims.

What I claim is:

1. A hardenable binder composition consisting essentially of phenolic resin, hydroxyethylcellulose and a silane, said hydroxyethylcellulose being present in an amount sufficient to increase the wet tensile strength of the binder composition after cure thereof.

2. A composition as claimed in claim 1 wherein the hydroxyethylcellulose is present in an amount of about 0.1 to 2 percent based on the dry weight of the phenolic resin.

3. A composition as claimed in claim 2 wherein the silane is present in an amount from about 0.01 to about 10 percent based on the dry weight of the phenolic resin.

4. In a process for preparing a hardenable phenolic resin binder composition, the improvement which consists essentially of incorporating into the composition hydroxyethylcellulose in an amount sufficient to increase the wet tensile strength of the binder composition after cure thereof and a silane.

5. The process of claim 4 wherein the amount of hydroxyethylcellulose is about 0.1 to 2 percent based on the dry weight of the phenolic resin.

* * * * *